US012109172B2

(12) United States Patent
Rey

(10) Patent No.: US 12,109,172 B2
(45) Date of Patent: Oct. 8, 2024

(54) LOCKING COVER FOR A CONTAINER HAVING A NECK, WITH A CAP HAVING BREAKABLE SECURING TABS

(71) Applicant: A. RAYMOND ET CIE, Grenoble (FR)

(72) Inventor: Gaëtan Rey, Voiron (FR)

(73) Assignee: A. RAYMOND ET CIE, Grenoble (FR)

( * ) Notice: Subject to any disclaimer, the term of this patent is extended or adjusted under 35 U.S.C. 154(b) by 0 days.

(21) Appl. No.: 17/759,000

(22) PCT Filed: Dec. 8, 2020

(86) PCT No.: PCT/FR2020/052327
§ 371 (c)(1),
(2) Date: Jul. 18, 2022

(87) PCT Pub. No.: WO2021/144511
PCT Pub. Date: Jul. 22, 2021

(65) Prior Publication Data
US 2023/0036805 A1 Feb. 2, 2023

(30) Foreign Application Priority Data
Jan. 16, 2020 (FR) ........................................ 2000416

(51) Int. Cl.
*A61J 1/14* (2023.01)
*B65D 51/00* (2006.01)
(Continued)

(52) U.S. Cl.
CPC .......... *A61J 1/1412* (2013.01); *B65D 51/002* (2013.01); *B65D 51/18* (2013.01); *B65D 55/026* (2013.01);
(Continued)

(58) Field of Classification Search
CPC ................ B65D 51/002; B65D 51/241; B65D 2251/0075; B65D 51/20; B65D 51/18;
(Continued)

(56) References Cited

U.S. PATENT DOCUMENTS 4,185,747 A * 1/1980 Goncalves ............. B65D 39/00 215/253
5,269,429 A * 12/1993 Schumacher ...... B65D 55/0872 215/256
(Continued)

FOREIGN PATENT DOCUMENTS

EP 1094012 B1 12/2006
EP 2464577 B1 2/2018
(Continued)

OTHER PUBLICATIONS

International Search Report for International Application No. PCT/FR2020/052327 dated Mar. 22, 2021, 4 pages.
(Continued)

*Primary Examiner* — Steven A. Reynolds
*Assistant Examiner* — Prince Pal
(74) *Attorney, Agent, or Firm* — TraskBritt

(57) ABSTRACT

A locking cover for a container having a neck comprising: a cage made from plastic; a body made from plastic, which is fastened around the cage, the body comprising a central orifice; a cap configured to close the central orifice, the cap comprising a flat head to cover the orifice and fastening lugs caught between the cage and the body. Each fastening lug has a breakable zone, and the cap is made from a plastic material, different from the plastic material of the cage and from the plastic material of the body, the plastic material of the cap being chosen to have a resistance to rupture reduced by a dose of gamma irradiation for sterilizing the locking cover.

14 Claims, 2 Drawing Sheets

(51) Int. Cl.
*B65D 51/18* (2006.01)
*B65D 55/02* (2006.01)
*B67C 7/00* (2006.01)

(52) U.S. Cl.
CPC ........ *B67C 7/00* (2013.01); *B65D 2251/0015* (2013.01); *B65D 2251/009* (2013.01)

(58) Field of Classification Search
CPC ........ A61J 1/1425; A61J 1/201; A61J 1/1406; A61J 1/2096; A61J 1/1412; A61J 1/00; A61J 1/2041; A61J 1/2093
USPC ....... 215/249, 277, 247, 274, 253, 296, 280, 215/327, 255, 40, 364; 220/324, 319, 220/787; 604/411, 415
See application file for complete search history.

(56) References Cited

U.S. PATENT DOCUMENTS 5,314,084 A * 5/1994 Folta .................... B65D 51/241 215/350
5,421,469 A * 6/1995 Lee .................... B65D 55/0872 215/280
8,684,225 B2 * 4/2014 Gelibert ............... B65D 51/002 215/277
9,382,044 B2 * 7/2016 Chanas .................. B65D 41/48
9,668,939 B2 * 6/2017 Carrel ................... A61J 1/2082
10,099,823 B2 * 10/2018 Kawamura ............ B65D 41/58
10,144,560 B2 * 12/2018 Mutterle ............ B65D 51/2807
10,843,913 B2 * 11/2020 Mutterle .............. B65D 45/322
11,738,915 B2 * 8/2023 Clavel .................... B65D 81/18 215/40
2001/0019022 A1 9/2001 Nakao et al.
2002/0023409 A1 * 2/2002 Py ........................... A61L 2/081 53/426
2005/0086830 A1 * 4/2005 Zukor ................. B01L 3/50825 34/443
2010/0050575 A1 * 3/2010 Aneas .................. B65D 51/002 53/485
2010/0224632 A1 * 9/2010 Aneas .................. B65D 51/002 220/315
2010/0243599 A1 * 9/2010 Chae .................... B65D 45/322 215/280
2011/0068106 A1 * 3/2011 Zukor ................. B01L 3/50825 220/367.1
2011/0266249 A1 * 11/2011 Kakutani ............. B65D 51/002 215/296
2012/0160850 A1 * 6/2012 Gelibert ............... B65D 55/063 220/315
2012/0187072 A1 * 7/2012 Belle ...................... B65D 45/32 215/274
2013/0233822 A1 * 9/2013 Aneas .................... B65D 41/28 215/320
2014/0217099 A1 * 8/2014 Browne ................ A61J 1/1412 220/259.5
2015/0013811 A1 * 1/2015 Carrel ................... A61J 1/1425 137/798
2015/0013837 A1 * 1/2015 Barrelle .................. A61J 1/201 141/330
2015/0014316 A1 * 1/2015 Chanas ................ B65D 51/002 215/274
2016/0194121 A1 * 7/2016 Ogawa ...................... A61J 1/05 215/249
2016/0200488 A1 * 7/2016 Friedrich ............. B65D 51/002 215/253
2017/0297781 A1 * 10/2017 Kawamura ............ B65D 51/18
2021/0009320 A1 * 1/2021 Clavel .................... B65D 1/023
2022/0354745 A1 * 11/2022 Dadachanji .......... B65D 51/002

FOREIGN PATENT DOCUMENTS

EP 3326932 B1 9/2019
FR 1334575 A 8/1963
FR 2893922 B1 5/2010
JP S55-080263 A 6/1980
JP 55-092819 A 7/1980
JP H07-257640 A 10/1995
JP 11-157556 A 6/1999
TW M516982 2/2016
WO 95/25043 A1 9/1995
WO 95/25045 A1 9/1995
WO WO-2011039004 A1 * 4/2011 ............. B65D 41/62
WO 2013/034594 A1 9/2012
WO 2017/201370 A1 11/2017
WO 2019/144067 A1 7/2019

OTHER PUBLICATIONS

International Written Opinion for International Application No. PCT/FR2020/052327 dated Mar. 22, 2021, 6 pages.
Chinese Office Action for Application No. 202110001867.9 dated Aug. 5, 2024, 23 pages with translation.
Japanese Official Notice of Rejection for Application No. 2022-539644 dated Jul. 30, 2024, 4 pages.

* cited by examiner

LOCKING COVER FOR A CONTAINER HAVING A NECK, WITH A CAP HAVING BREAKABLE SECURING TABS

CROSS-REFERENCE TO RELATED APPLICATIONS

This application is a national phase entry under 35 U.S.C. § 371 of International Patent Application PCT/FR2020/052327, filed Dec. 8, 2020, designating the United States of America and published as International Patent Publication WO 2021/144511 A1 on Jul. 22, 2021, which claims the benefit under Article 8 of the Patent Cooperation Treaty to French Patent Application Serial No. FR2000416, filed Jan. 16, 2020.

TECHNICAL FIELD

The present disclosure relates to a locking cover for a container comprising a neck, intended to block a stopper in the neck of the container. It relates more particularly to a locking cover for a container with a neck used in the medical or pharmaceutical field, provided with a breakable cap so as to attest to the inviolability of the container.

BACKGROUND

Inviolability or proof that a medical product has already been used or that a container comprising a medical solution has already been opened, whether intentionally or not, is an important issue, in particular with a view to limiting the risks of patient contamination. The present disclosure relates more particularly to the case of containers with necks.

Document FR2893922 discloses a locking cover arranged on a stopper so as to lock it assembled to a container with a neck. This locking cover comprises a central orifice for accessing the contents of the container through the stopper, this orifice being closed by a cap, which is welded to the cover. In order to access the contents of the container, it is necessary to break the connection between the cap and the cover. Since the cap is thus irreversibly separated from the cover, it is impossible to reuse the cap. The breaking of the connection therefore shows that this is the first use of the container. However, the assembly method for this locking cover is complex and in particular has a welding step. It would be beneficial to have a simpler assembly method. In addition, the fact that the cap is welded can cause the cap to hold very strongly to the locking cover and cause the breaking of the connection not to be very ergonomic.

Document WO2011/039004 proposes an alternative approach. In this document, the cap is not welded to the cover, but is configured such that it can be irreversibly detached from the cover without the possibility of being returned to its initial state. More particularly, the cap comprises a flat head as well as fastening lugs projecting substantially perpendicularly with respect to the head. These lugs are caught between the various elements, which make up the cover during assembly. This catching makes it possible to exceed the elastic limit of the fastening lugs so that the latter remains in a folded configuration when the cap is separated from the locking cover. This folded configuration of the lugs, combined with a protuberance at the end of the lugs, makes it difficult to reassemble the cap to the locking cover.

However, it was found that, under certain very precise conditions, it was possible to reinsert the cap on the cover of the container, making the proof of first use and of inviolability of the container less reliable.

Also known from documents WO2013034594 and FR1334575 are locking covers comprising a cap provided with breakable fastening lugs. Any attempt to access the contents of the container requires removing the cap, which leads to breaking the fastening lugs. It is thus not possible to reposition the cap on the cover so as to conceal the opening or the attempted opening of the container.

The design and the manufacture of caps fitted with such breakable fastening lugs must be perfectly mastered. The force to be applied to the cap in order to remove it from the cover should not be excessive for the user. At the same time, the fastening lugs should not be too fragile in order to avoid breaking them during the initial assembly of the cap to the rest of the cover. However, the variations, which appear within a cap production run, or between different cap production runs, can affect this perfect mastery of the breakable nature of the fastening lugs, which in turn can affect the manufacturing yield during the initial assembly of the caps, or can affect the ease of use of the solution by making the effort to remove the cap highly variable from one container to another.

Generally speaking, the use of any device in the medical field requires prior sterilization of the device, regardless of the solution chosen to close a container and make access to its contents inviolable. It is common practice to achieve this sterilization by irradiating the device with a sufficient dose of gamma rays. The materials forming such a medical device are therefore chosen very particularly when they are made of plastic, so that they are not affected by this irradiation, in particular as regards their mechanical strength.

BRIEF SUMMARY

An object of the present disclosure is to propose a locking cover provided with a breakable cap, which at least partially overcomes the aforementioned drawbacks. An object of the present disclosure is, in particular, to propose a cap for a locking cover for a container with a neck, the cap being provided with breakable fastening lugs, which are rigid enough to limit the risk of breaking during assembly of the cap to the cover, while being fragile enough once assembled to promote this breaking during removal of the cap.

In order to achieve this aim, the object of the present disclosure proposes a locking cover for a container with a neck intended to block a stopper in the neck of the container, comprising:

- a cage made from plastic material configured to surround the stopper and the neck and lock them axially in position relative to each other;
- a body made from plastic material, which is fastened around the cage, the body comprising a central orifice providing an access from the outside of the cover to the inside of the container through the stopper;
- a cap configured to close the central orifice, the cap comprising a flat head to cover the orifice and fastening lugs caught between the cage and the body;

the locking cover is remarkable in that:

each fastening lug has a breakable zone, the cap is formed of a plastic material different from the plastic material of the cage and from the plastic material of the body, the plastic material of the cap being chosen to have a resistance to rupture, which is reduced by a dose of gamma irradiation to sterilize the cover.

According to other advantageous and non-limiting features of the present disclosure, taken alone or in any technically feasible combination:

- the material of the cap comprises polypropylene;
- the breakable zone corresponds to a local thinning of the thickness of the fastening lug, such as a notch or a groove;
- the breakable zone has a thickness between 30 and 70% of that of the fastening lug;
- the breakable zone is located in a junction region of the fastening lug on the head of the cap;
- the material of the cap exhibits a loss of elongation greater than or equal to 25% after receiving a dose of gamma irradiation of 50 kGy.

The present disclosure also relates to a method for preparing a locking cover as previously disclosed, comprising:

- arranging the cap on the body of the cover, the fastening lugs of the cap extending into the central orifice of the body;
- inserting the cage into the body to grip the fastening lugs of the cap caught between the body and the cage, to form the assembled locking cover;
- sterilizing the assembled locking cover by gamma irradiation.

This gamma irradiation can present a dose of between 10 kGy and 20 kGy.

BRIEF DESCRIPTION OF THE DRAWINGS

Other features and advantages of the present disclosure will become apparent from the following detailed description of embodiments of the present disclosure, which is provided with reference to the accompanying figures, in which.

DETAILED DESCRIPTION

General Presentation of the Locking Cover

Figure 1:
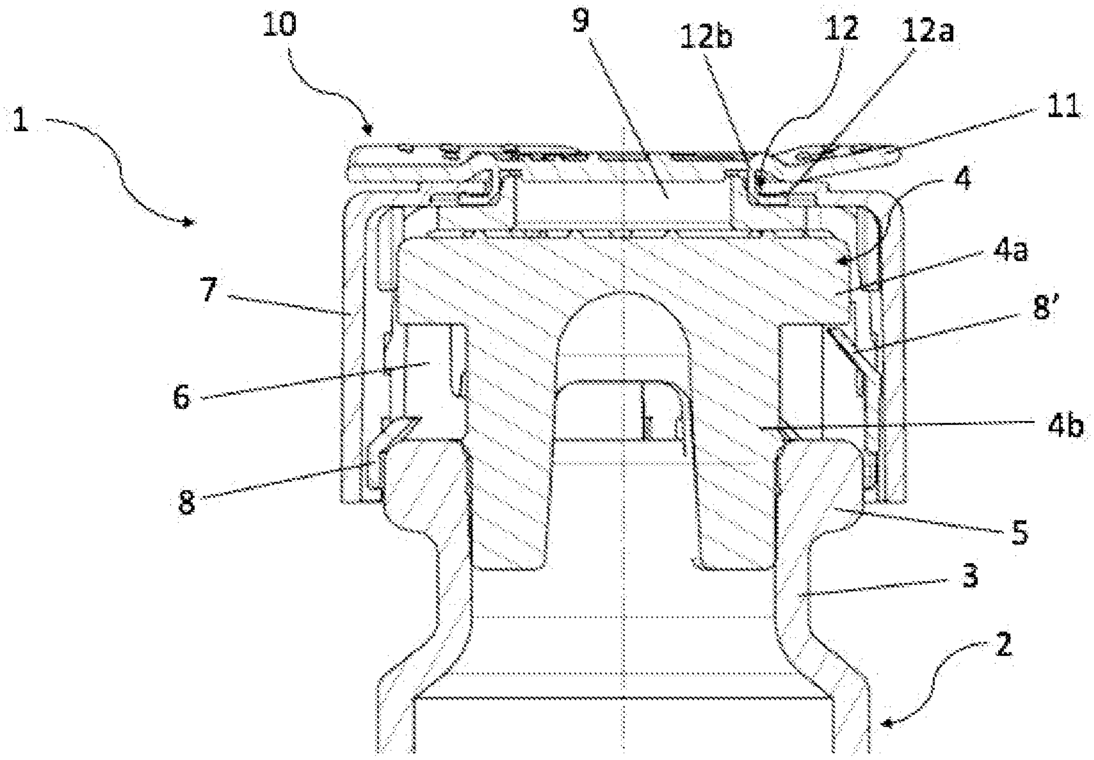
FIG. 1 shows a sectional view of an assembled locking cover according to the present disclosure.

FIG. 1 shows a locking cover 1 for a container 2 with a neck 3, according to the present disclosure, intended to block a stopper 4 in the neck 3 of the container 2, the cover 1 being shown here simply placed on the neck 3 without being locked.

The neck 3, here with a circular opening, has an outer peripheral lip 5 at its end, on which lip the locking cover 1 is blocked when the cover 1 is locked on the neck 3 of the container 2. The stopper 4 has a conventional, generally cylindrical, T shape with a head 4*a* and a base 4*b*, the head having a diameter slightly larger than the base 4*b*, so that, when the base 4*b* of the stopper 4 is introduced into the neck 3, the head 4*a* abuts against the lip 5 of the neck 3.

The locking cover 1 comprises a cage 6, which is able to surround the stopper 4 and the neck 3, when the cover 1 is in the locked configuration on the neck 3 of the container 2, as well as a body 7, which is able to be fastened around the cage 6. The cage 6 allows the stopper 4 to be blocked in the neck 3, by means of flexible tabs 8 arranged on the periphery of the cage 6, which are intended to be blocked under the lip 5. Other means of blocking the stopper 4 by the cage 6 could of course be considered. In the assembled configuration of the cover 1, the body 7 completely covers the cage 6 laterally so as to prevent any access to the cage 6 and to the flexible lugs 8 from outside the body 7. Both the body and the cage are formed from a plastic material, which is not susceptible to degradation upon gamma sterilization of the cover.

The loss of elongation of a material is a criterion commonly used to measure the effect of irradiation on its resistance to rupture. In the context of the present application, it will be considered that a material is not degraded after having received a dose of gamma rays sufficient to sterilize it when the loss of elongation of this material is less than 25% after having received a gamma irradiation dose of 50 kGy. On the contrary, it will be considered that this material is degraded after having received a dose of gamma rays sufficient to sterilize it, and that its resistance to rupture is reduced, when the loss of elongation of this material is greater than or equal to 25% after having received a gamma irradiation dose of 50 kGy.

The body 7 and the cage 6 are not necessarily made of the same material, and, for example, the plastic material forming the body 7 can be polybutylene terephthalate (also known by the abbreviation "PBT"), and that of the cage 6 can be polycarbonate (also known by the abbreviation "PC"). These two plastics require a dose of gamma rays much greater than 500 kGy, or even greater than 1000 kGy, so that the loss of elongation generated by this irradiation exceeds 25%. They are therefore not liable to be degraded during gamma ray sterilization of the cover in the considered dose ranges.

Figure 4:
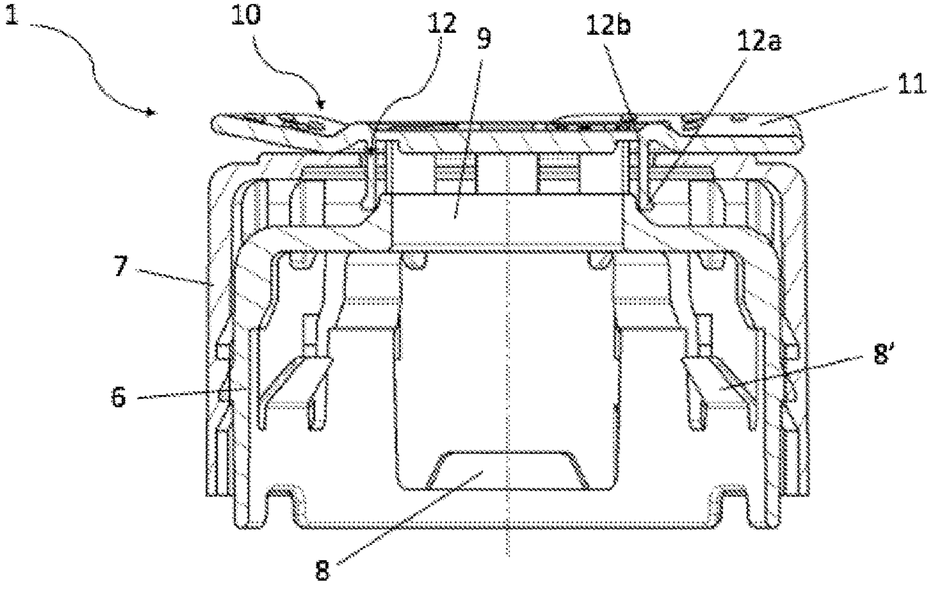
FIG. 4 shows a sectional view of a locking cover according to the present disclosure before being fully assembled.

Continuing the general disclosure of the cover 1 of FIG. 1, the body 7 also comprises a central orifice 9 providing an access from the outside of the cover 1 to the inside of the container 2 through the stopper 4. It is therefore possible to access the contents of the container 2 through this orifice 9, for example, by inserting the needle of a syringe through the stopper 4. It will be noted that of course, as can be seen in FIG. 4, the body 7 and the cage 6 also each have a central opening to allow access to the stopper 4 and therefore to the contents of the container 2.

The locking cover 1 also comprises a cap 10, which is configured to close the central orifice 9 and to attest to the inviolability of the container 2. This cap 10 comprises a flat head 11 so as to cover the orifice 9 as well as a plurality of fastening lugs 12. The fastening lugs 12 are caught between the cage 6 and the body 7 so as to keep the cap 10 assembled to the locking cover 1.

Detailed Description of the Cap

Figure 2A:
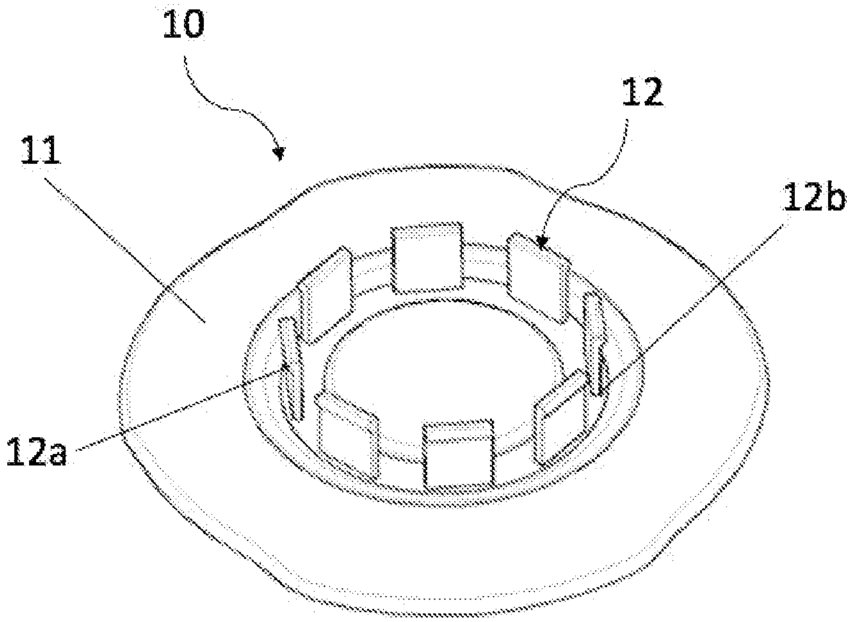
FIGS. 2A and 2B respectively show a bottom view and a top view of a cap according to the present disclosure.
Figure 2B:
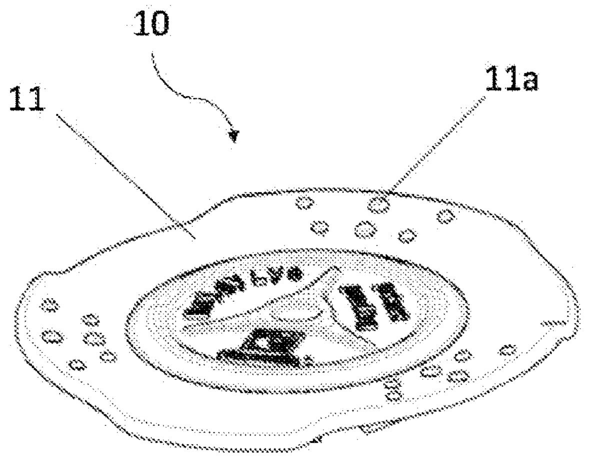

FIGS. 2A and 2B show a cap 10 according to the present disclosure for closing the central orifice 9 of the body 7. This cap 10 has fastening lugs 12, here, for example, eight lugs 12, which in the resting position project perpendicular to the flat head 11 of the cap 10.

The cap 10 with the flat head 11 and the fastening lugs 12 is advantageously formed from a single piece of molded plastic material. The flat head 11 may have the shape of a disc or of another more complex shape such as a polygon, for example, as long as the flat head surface 11 completely covers the central orifice 9.

The flat head 11 can also be provided with gripping elements 11*a*, here in the form of reinforcement points, to facilitate the gripping of the cap 10 when it is removed from the cover 1.

The fastening lugs 12 are distributed circularly and distributed along the periphery of the orifice 9 of the body 7 when the cap 10 is in the assembled configuration with the body 7. The fastening lugs 12 may have a free end, which is beveled and/or provided with a locking ridge 12*a*. The thickness of the fastening lugs 12 is between 0.3 and 0.6 mm; it may, for example, be 0.37 mm.

The locking ridge 12*a* has larger dimensions than those of the rest of the fastening lug 12; its purpose is to better keep the cap 10 assembled to the cover 1 by generating additional resistance, if an attempt is made to remove the cap 10 by sliding the fastening lugs 12 out of their vise. In the absence of a locking ridge 12*a*, initial resistance exists, which requires the application of a predetermined force to release the fastening lugs 12 from their vise. This resistance comes from the folded shape assumed by the fastening lugs 12 when they are caught between the body 7 and the cage 6. The presence of the locking ridge 12*a* generates the need to apply a greater force than that which is initially predetermined to release the fastening lugs 12 from their vise. This additional force becomes greater as the dimensions of the locking ridge 12*a* are increased. Preferably, the locking ridge 12*a* has a thickness 35% to 170% greater than that of the fastening lug 12, i.e., for example, a thickness of between 0.5 and 1.0 mm for a fastening lug 12 with a thickness of 0.37 mm.

It is beneficial for the cap 10 to be breakable and to be able to break, more particularly at the fastening lugs 12, when it is removed from the cover 1. The withdrawal is thus irreversible and is a reliable indicator of first use because the cap 10 cannot be reassembled to the cover 1.

In order to achieve this objective, there is an effort to reduce the resistance to rupture of the cap 10 so that the force necessary to release the fastening lugs 12 from their vise becomes greater than the force necessary to break the lugs of the cap 10. Thus, the cap 10 will break before the flexible lugs 12 can be released from their vise.

To achieve this, the cap 10 is formed from a plastic material whose resistance to rupture is reduced by gamma ray irradiation in a dose aimed at sterilizing the cover 1. In other words, the material from which the cap 10 is made becomes more fragile, and its resistance to rupture reduced, after having undergone gamma irradiation. This material is characterized by a loss of elongation greater than or equal to 25%, if it receives a dose of gamma ray irradiation of 50 kGy.

It can mainly be a polypropylene-based material, or it can be made of polypropylene.

The gamma ray irradiation aimed at rendering the cover sterile is preferably carried out with a dose typically between 10 kGy and 20 kGy, for example, 15 kGy, and after the cap 10 has been assembled with the rest of the cover 1. Thus, only the plastic material making up the cap 10 will be degraded by this sterilization step, the plastic materials forming the cage 6 and the body 7 having been chosen so as not to be liable to be excessively degraded during exposure to gamma rays.

It should be noted that possible degradation of the material of the cap does not present a risk of contamination of the contents of the container because the cap, by virtue of its position and its configuration in the cover, is not in contact with or exposed to the contents of the container and therefore does not risk contaminating them, for example, by generating particles during its degradation.

The force, which must be applied to break the lugs 12 of the cap 10, is therefore lower after the sterilizing gamma irradiation and it becomes less than the force necessary to release the flexible lugs 12 from their vise.

Figure 3:
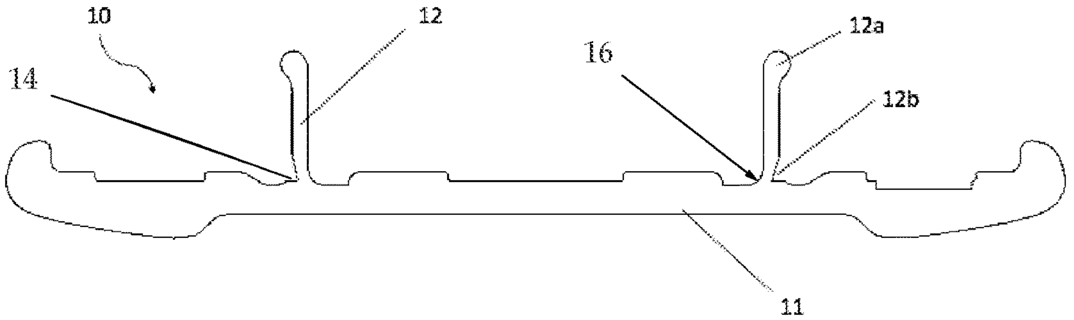
FIG. 3 shows a sectional view of a breakable zone of a fastening lug according to the present disclosure.

In addition, and to promote and localize their breaking, the fastening lugs 12 each have a breakable zone 12*b* visible in FIG. 3. This breakable zone 12*b* advantageously corresponds to a local thinning of the thickness of the fastening lug 12. It may thus, for example, be a notch or a groove 14 having a fixed or progressive thinning delimited by one or more inclined slopes.

Preferably, the breakable zone 12*b* corresponds to a portion of the fastening lug 12 having a thickness between 30% to 70% of that of the fastening lug 12, for example, a thickness between 0.11 and 0.26 mm for a fastening lug with a thickness of 0.37 mm. The dimensions of the breakable zone, and more generally of the fastening lugs 12, are therefore advantageously chosen to avoid any risk of breaking during the assembly of the elements of the cover 1, before the irradiation step.

Also advantageously, the breakable zone 12*b* is located in a junction region 16 of the fastening lug 12 on the head of the cap 10.

The properties of the breakable zone 12*b* and the material of the cap 10 have the effect of reducing the resistance to rupture of the cap 10 after assembly of the locking cover 1, but preventing the lugs from breaking during the assembly, and better locating the place where the break will occur. The presence of these breakable zones 12*b* combined with the gamma ray irradiation makes it possible to further reduce the force necessary to break the breakable zone 12*b* and ensure that the cap 10 breaks at the zones 12*b* before the fastening lugs 12 can have the possibility of freeing themselves from their vise.

Preparation and Use of the Locking Cover

The operations for preparing the locking cover are now described with reference to FIGS. 1 and 4. FIG. 4 shows a sectional view of a cover 1, the component elements of which are being assembled, while in FIG. 1 the component elements of the cover 1 are already assembled and placed on the neck 3 of the container 2.

First of all, a cap 10 with straight fastening lugs 12 is placed on the body 7 of the cover 1, so that the fastening lugs 12 extend into the central orifice 9 of the body 7 and the flat head 11 completely covers the orifice 9. Advantageously, the cap 10 is arranged upside down, the fastening lugs 12 facing upward, and the body 7 is then placed on the cap 10 so that the lugs 12 penetrate through the central orifice 9.

The cage 6 is then inserted into the body 7 (FIG. 4) until the cage 6 comes into abutment against the body 7 in order to grip the fastening lugs 12 of the cap 10. The latter bend, between the body 7 and the cage 6, and are kept in this position due to the blocking by lugs of the cage 6 in the body 7. The assembled locking cover 1 is thus formed (FIG. 1). At this stage, since the cover has not yet been sterilized by gamma ray irradiation, the material forming the cap has not been degraded and therefore retains its initial resistance to rupture. The risk of the lugs breaking at this stage is thus low, even in the presence of the breakable zones 12*b*.

A stopper 4 is introduced into the cage 6 until it comes into abutment against the cage. When inserting the stopper 4 into the cage 6, the flexible lugs 8' deform, then return to their initial shape when the stopper 4 is in place by positive bearing behind the head 4*a* of the stopper 4 so as to keep it assembled in the cover 1, as can be seen in FIG. 1.

The assembled locking cover 1 is then sterilized by gamma ray irradiation in a dose of between 10 kGy and 20 kGy, preferably of the order of 15 kGy. During this step, only the mechanical properties of the material of the cap 10 are effectively modified, making it less resistant to breaking, the other elements of the cover being formed from different materials, which are not liable to deteriorate during this step.

At the end of this step, the locking cover 1 is ready to be used to block the stopper 4 in the neck 3 of a container 2 with neck 3. The assembly formed by the locking cover 1 and the stopper 4 can then be mounted on a container 2 by introducing, by simple axial pressure on the cap 10, the base 4*b* of the stopper 4 into the neck 3 of the container 2. A leak-tight and inviolable closure of the container 2 is obtained by the stopper 4 owing to the locking cover 1, the flexible tabs 8 of which are blocked under the lip 5 of the neck 3.

The presence of the cap 10 attests to the inviolability of the container 2. Indeed, to access the contents of the container 2, it is necessary to remove the cap 10. When the cap 10 is removed, because the force necessary to break the breakable zone 12*b* is less than the force necessary to release the fastening lugs 12 from their vise, the breakable zones 12*b* of the majority, i.e., more than 50% and preferably more than 80% (or even all) of the fastening lugs 12 break and a piece of the lugs remains caught in the cover 1. It is then no longer possible to close the orifice 9, the breaking of the breakable zones 12*b* thus attests to the first use of the container 2.

In addition, the inviolable nature of the cover 1 also comes from the fact that the cover 1 is configured to break and not to be reusable, for example, by breaking the elements, which are responsible for assembling the cage 6 with the body 7, if an attempt is made to remove it once it is assembled to the container 2.

As will be readily understood, the present disclosure is not limited to the described embodiment, and it is possible to add variants thereto without departing from the scope of the invention as defined by the claims.

In particular, forms of body and cage other than those illustrated in the figures could be envisaged. It would also be possible for the locking cover to include additional elements without departing from the scope of the invention as defined by the claims.

The invention claimed is:

1. A locking cover for a container having a neck, the locking cover configured to block a stopper in the neck of the container, the locking cover comprising:

a cage comprising plastic material and configured to surround the stopper and the neck and lock the stopper and the neck axially in position relative to each other;

a body comprising plastic material, the body fastened around the cage, the body comprising a central orifice providing access from the outside of the locking cover to the inside of the container through the stopper, and a cap configured to close the central orifice, the cap comprising a flat head to cover the central orifice and fastening lugs retained between the cage and the body, each fastening lug having a breakable zone;

wherein the cap comprises a plastic material different from the plastic material of the cage and from the plastic material of the body, the plastic material of the cap exhibiting a reduced resistance to rupture responsive to a dose of gamma irradiation sufficient to sterilize the locking cover.

2. The locking cover of claim 1, wherein the plastic material of the cap exhibits a loss of elongation greater than or equal to 25% responsive to a dose of gamma irradiation of 50 kGy.

3. The locking cover of claim 2, wherein the plastic material of the cap comprises polypropylene.

4. The locking cover of claim 3, wherein the breakable zone corresponds to a local thinning of the thickness of the fastening lugs.

5. The locking cover of claim 4, wherein the breakable zone has a thickness of between 30 and 70% of a thickness of the respective fastening lug.

6. The locking cover of claim 5, wherein the breakable zone is located in a junction region of the fastening lug on the flat head of the cap.

7. A method of forming the locking cover according to claim 1, the method comprising:

arranging the cap on the body of the locking cover, the fastening lugs of the cap extending into the central orifice of the body;

inserting the cage into the body to grip the fastening lugs of the cap caught between the body and the cage, to form the assembled locking cover; and sterilizing the assembled locking cover by gamma irradiation.

8. The method of claim 7, wherein the dose of gamma irradiation is between 10 kGy and 20 kGy.

9. The locking cover of claim 4, wherein the breakable zone comprises a notch or a groove.

10. The locking cover of claim 1, wherein the plastic material of the cap comprises polypropylene.

11. The locking cover of claim 1, wherein the breakable zone corresponds to a local thinning of the thickness of the fastening lugs.

12. The locking cover of claim 11, wherein the breakable zone comprises a notch or a groove.

13. The locking cover of claim 11, wherein the breakable zone has a thickness of between 30 and 70% of a thickness of the respective fastening lug.

14. The locking cover of claim 1, wherein the breakable zone is located in a junction region of the fastening lugs on the flat head of the cap.

* * * * *